UNITED STATES PATENT OFFICE.

ADOLF BAEYER, OF MUNICH, BAVARIA, GERMANY, ASSIGNOR TO THE BADISCHE ANILIN AND SODA FABRIK, OF MANNHEIM, GERMANY.

MANUFACTURE OF ARTIFICIAL INDIGO.

SPECIFICATION forming part of Letters Patent No. 250,036, dated November 22, 1881.

Application filed July 21, 1881. (Specimens.)

*To all whom it may concern:*

Be it known that I, ADOLF BAEYER, a subject of the King of Bavaria, residing at Munich, in the Kingdom of Bavaria and Empire of Germany, have invented new and useful Improvements in the Manufacture of Artificial Indigo, of which the following is a specification.

This invention relates to the production of a new coloring-matter or dye-stuff, which I term "Indogen."

In carrying out my invention I take an ether compound of orthonitrophenylpropiolic acid—such, for instance, as the ethylic ether of the said acid—and I treat the same with a cold solution of ammonium sulph-hydrate until no further reaction is observed to take place, or until a sample of the insoluble portion of the product ceases to dissolve with an orange-red color in concentrated sulphuric acid. I then add a slight excess of muriatic acid, by which a precipitate is produced. The precipitate thus produced is filtered and washed, and then exhausted by repeated treatment with a cold and dilute solution of caustic soda. The alkaline extract thus obtained is acidified with muriatic acid, whereby indogenic ether is precipitated. In order to convert the said indogenic ether into indogenic acid, I treat the former with hot and concentrated caustic alkalies, in which treatment I proceed as follows: I take from three to five parts, by weight, of caustic soda, and add so much water that the mixture has a fusing-point of 160° to 180° centigrade. To this mixture I gradually add one part, by weight, of the indogenic ether and keep the whole mass at a temperature of from 160° to 180° centigrade, stirring it well all the time until the fusing process is completed, or until no longer any alcoholic vapors are evolved. I then allow the mass to cool, and add the same, in small portions at a time, to an excess of cold muriatic acid, whereby a precipitate of indogenic acid is obtained which may be collected on a filter, washed, and dried. I then convert the indogenic acid thus prepared into indogen by the action of heat upon the said acid, either in its dry state or in the presence of water or any other suitable solvent. For instance, indogenic acid is carefully heated up to about 122° centigrade when the acid first fuses, and then decomposes into carbonic acid and indogen, the former escaping into the air, the latter remaining in the shape of an oily liquid.

The characteristic properties of indogen are the following: Indogen is an oily liquid soluble in hot water and not volatile in an atmosphere of steam. In an alkaline solution indogen is rapidly converted into artificial indigo-blue by the access of air. A similar oxidation is produced by the action upon it of acid-oxidizers—such as acid solutions of the perchlorides of iron or of copper, or of bichromate of potash.

What I claim as new, and desire to secure by Letters Patent, is—

1. As a new article of manufacture, the coloring-matter or dye-stuff termed "indogen," and having the characteristics above set forth.

2. The within-described process of producing indogen by the action of heat upon indogenic acid, substantially in the manner herein set forth.

In testimony whereof I have hereunto set my hand in the presence of two subscribing witnesses.

ADOLF BAEYER.

Witnesses:
    PAUL FRIEDLAENDER,
    WILHELM HAUSSMANN.